(12) United States Patent
Poppenga et al.

(10) Patent No.: US 9,338,733 B1
(45) Date of Patent: May 10, 2016

(54) METHOD AND APPARATUS FOR DETERMINING THE AVAILABILITY OF A FIRST DEVICE IN A WIRELESS NETWORK TO PROVIDE A SERVICE TO A SECOND DEVICE WITHIN THE WIRELESS NETWORK

(71) Applicant: MARVELL INTERNATIONAL LTD., Hamilton (BM)

(72) Inventors: Burt Poppenga, Eagle, ID (US); DeVerl Stokes, Eagle, ID (US); Philip McDonnell, Coto de Caza, CA (US)

(73) Assignee: MARVELL INTERNATIONAL LTD. (BM)

( * ) Notice: Subject to any disclaimer, the term of this patent is extended or adjusted under 35 U.S.C. 154(b) by 126 days.

(21) Appl. No.: 14/052,840

(22) Filed: Oct. 14, 2013

Related U.S. Application Data

(60) Provisional application No. 61/713,823, filed on Oct. 15, 2012.

(51) Int. Cl.
*H04W 48/16* (2009.01)

(52) U.S. Cl.
CPC ...................................... *H04W 48/16* (2013.01)

(58) Field of Classification Search
CPC ............................ H04W 48/16; H04W 72/005
See application file for complete search history.

(56) References Cited

U.S. PATENT DOCUMENTS

| 2002/0124169 | A1* | 9/2002 | Agrawal et al. ............... 713/168 |
| 2004/0072580 | A1* | 4/2004 | Honda et al. ............... 455/456.1 |
| 2004/0103179 | A1* | 5/2004 | Damm et al. .................. 709/223 |
| 2005/0185621 | A1* | 8/2005 | Sivakumar et al. ........... 370/335 |
| 2008/0089244 | A1* | 4/2008 | Yu ................................. 370/255 |
| 2012/0201186 | A1* | 8/2012 | Awano .......................... 370/312 |
| 2013/0155905 | A1* | 6/2013 | Sampath et al. .............. 370/255 |

\* cited by examiner

*Primary Examiner* — Mohammad Anwar

(57) ABSTRACT

Systems, methods, and other embodiments associated with determining the availability of a first device in a wireless network to provide a service to a second device within the wireless network are described. According to one embodiment, a method includes periodically transmitting a discovery packet, in accordance with a broadcast communication protocol, within a network. The discovery packet comprises a request to reply with a corresponding name of the responding device. The corresponding name of each responding device is received and stored in memory. When a request to identify devices in the network is received, a confirmation packet comprising a request to confirm availability is respectively transmitted, in accordance with a point-to-point protocol, to devices having a corresponding name stored in the memory. A response confirming availability is received from responding devices. Only the names of the responding devices that confirmed availability are provided in response to the request.

17 Claims, 4 Drawing Sheets

METHOD AND APPARATUS FOR DETERMINING THE AVAILABILITY OF A FIRST DEVICE IN A WIRELESS NETWORK TO PROVIDE A SERVICE TO A SECOND DEVICE WITHIN THE WIRELESS NETWORK

CROSS REFERENCE TO RELATED APPLICATIONS

This patent disclosure claims the benefit of U.S. Provisional Application No. 61/713,823 filed on Oct. 15, 2012, which is hereby wholly incorporated by reference.

BACKGROUND

Mobile computing devices such as smart phones and laptops are routinely moved from one local wireless network to another. A mobile computing device often interacts with other computing devices (e.g., peripheral such as printers, monitors, and so on or other mobile devices) within the network where the device currently resides. The mobile computing device employs discovery techniques to discover the device names of other devices that are part of the network. The device names can be used by the mobile computing device to address packets used to communicate with the devices.

SUMMARY

In general, in one aspect this specification discloses an apparatus for determining the availability of a first device in a wireless network to provide a service to a second device within the wireless network. The apparatus includes a memory and a logic. The logic is configured to cause a discovery packet to be periodically transmitted, in accordance with a broadcast communication protocol, within a network. The discovery packet comprises a request for a responding device to reply to the request with a corresponding name of the responding device. Responsive to the discovery packet periodically transmitted, the logic is configured to receive from each responding device that responds to the discovery packet, the corresponding name of the responding device. The logic is configured to store, in the memory, the corresponding name of each responding device. A number of responding devices having a corresponding name stored in the memory potentially increases over time as the discovery packet is periodically transmitted.

The logic is configured to receive a request to identify devices in the network and, responsive to the request, cause a confirmation packet to be respectively transmitted, in accordance with a point-to-point protocol, to each of the number of responding devices having a corresponding name stored in the memory. The confirmation packet comprises a request for the respective responding device to confirm availability of the responding device.

Responsive to the confirmation packet respectively transmitted to each of the number of responding devices having a corresponding name stored in the memory, the logic is configured to receive a response confirming availability from one or more of the number of responding devices having a corresponding name stored in the memory. The logic is configured to respond to the request to identify devices in the network, with only the names of the one or more responding devices that confirmed availability in response to the confirmation packet respectively transmitted to the one or more responding devices.

In general, in another aspect, this specification discloses a method for determining the availability of a first device in a wireless network to provide a service to a second device within the wireless network. The method includes periodically transmitting a discovery packet, in accordance with a broadcast communication protocol, within a network. The discovery packet comprises a request for a responding device to reply to the request with a corresponding name of the responding device.

Responsive to the discovery packet periodically transmitted, the method includes receiving from each responding device that responds to the discovery packet, the corresponding name of the responding device. The method includes storing, in the memory, the corresponding name of each responding device from the discovery response packets. The number of responding devices having a corresponding name stored in the memory potentially increases over time as the discovery packet is periodically transmitted.

The method includes receiving a request to identify devices in the network. Responsive to the request to identify the devices in the network, the method includes respectively transmitting a confirmation packet, in accordance with a point-to-point protocol, to each of the number of responding devices having a corresponding name stored in the memory. The confirmation packet comprises a request for the respective responding device to confirm availability of the responding device.

Responsive to the confirmation packet respectively transmitted to each of the number of responding devices having a corresponding name stored in the memory, the method includes receiving a response confirming availability from one or more of the number of responding devices having a corresponding name stored in the memory. The method includes responding to the request to identify devices in the network with only the names of the one or more responding devices that confirmed availability in response to the confirmation packet respectively transmitted to the one or more responding devices.

In general, in another aspect, this specification discloses an integrated circuit device for determining the availability of a first device in a wireless network to provide a service to a second device within the wireless network. The integrated circuit device includes a cache memory, a transmitter, a receiver, and a cache controller. The transmitter is configured to send a discovery packet, in a network, in accordance with broadcast communication protocol. The discovery packet comprises a request for a responding device to reply to the request with a corresponding name of the responding device. The transmitter is also configured to send a confirmation packet to one or more specific devices in accordance with a point-to-point communication protocol. A confirmation packet comprises a request for the respective responding devices to confirm availability of the responding devices.

The receiver is configured to receive i) corresponding names of responding devices that respond to the discovery packet and ii) a response from responding devices confirming availability in response to the confirmation packet. The cache controller is configured to cause the transmitter to transmit the discovery packet and cause the receiver to receive the corresponding names from responding devices. The cache controller is configured to store, in the cache, the corresponding name of each responding device. In this manner, the number of responding devices having a corresponding name stored in the cache potentially increases over time.

The cache controller is configured to receive a request to identify devices in the network. Responsive to the request to identify the devices in the network, the cache controller is configured to cause the transmitter to transmit a confirmation packet, in accordance with a point-to-point protocol, to each of the number of responding devices having a corresponding name stored in the memory. Responsive to the confirmation packet respectively transmitted to each of the number of responding devices having a corresponding name stored in the memory, the cache controller is configured to cause the receiver to receive a response confirming availability from one or more of the number of responding devices having a corresponding name stored in the memory. The cache controller is configured to respond to the request to identify devices in the network with only the names of the one or more responding devices that confirmed availability in response to the confirmation packet respectively transmitted to the one or more responding devices.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
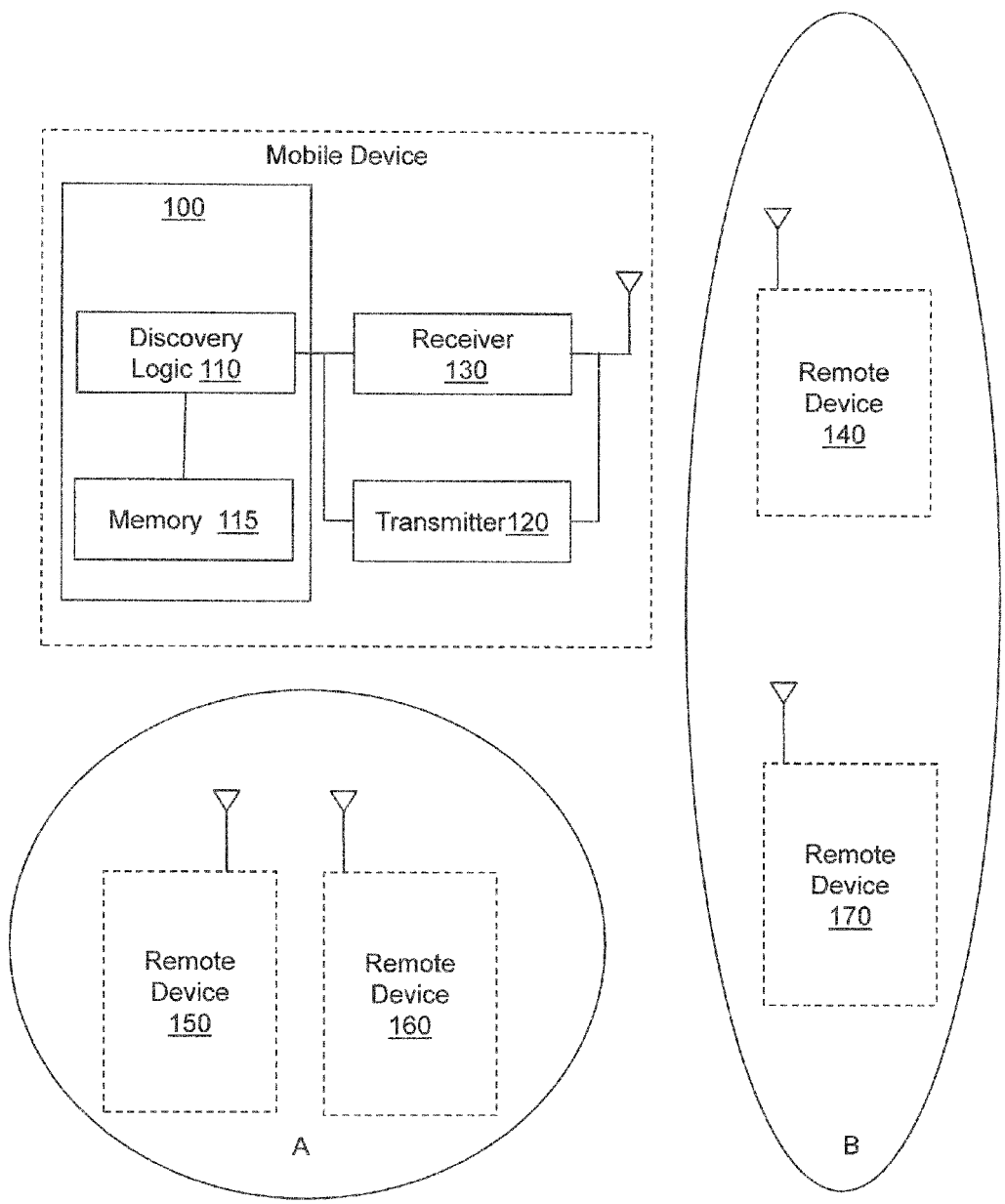
FIG. 1 illustrates one embodiment of an apparatus associated with determining the availability of a first device in a wireless network to provide a service to a second device within the wireless network.

For the purposes of this description, reference will be made to a "mobile device" or a "mobile computing device." These terms should be construed to encompass any device that includes a processor and is capable of communication with other devices in a network. When a mobile device requires service from another device within a network in which the mobile device currently resides, the mobile device needs to learn the names of devices (or "device names") within the network that can provide the service. For example, to print a document, a smart phone with a printing application needs the device names of printers that are currently active in the network. One technique that mobile devices use to discover the device names of other devices in the network is to broadcast a multipoint domain name server (mDNS) packet on the network. The mDNS packet is a request for each (network) device on the network that receives the packet to respond to the mobile device with the corresponding name of the network device. In one embodiment, a device name is the device's domain name that is mapped to the device's numerical network address (e.g. IP address). Any other unique identifier could be used to identify devices in a network.

The mDNS packet is transmitted using a broadcast protocol because the device names of the other devices are not known by the mobile device. The broadcast protocol causes the packet to be sent to all devices in the network, and the devices that receive the packet may in turn re-broadcast the packet to reach devices outside the wireless range of the packet's originator. In many networks, broadcast packets can be an unreliable way to communicate with other devices within the network. Broadcast packets are often propagated from device to device, making the broadcast packets susceptible to being dropped when network resources are busy. Broadcast packets can be lost when the network environment is noisy, and quality of service for broadcast packets is often lower than for packets transmitted in accordance with a point-to-point protocol. Thus, when a mobile computing device broadcasts the mDNS packet, the mobile computing device may not receive responses from some devices that are actually available. The non-responding devices are not included as options for a user for the mobile device, limiting the resources made available to the user.

Described herein are examples of systems, methods, and other embodiments that store, in a memory, device names of devices that respond to periodically broadcast discovery packets and, in response to a request for device names in the network, send (in accordance with a point-to-point communication protocol) confirmation packets to the devices whose device names are stored in the memory. Those devices that respond to the confirmation packets are identified in response to the request for device names. In this manner, devices that are identified as available are not limited to those devices from which responses to recently sent broadcast packets were received. Rather, device names can be accumulated by sending periodic broadcast discovery packets and storing the device names of responding devices in memory. When device names are requested by the mobile device, more reliable point-to-point communication can be used to confirm that the devices whose names are in memory are still available. Thus, the systems, methods, and other embodiments described herein provide a more comprehensive list of available devices without waiting for a lengthy discovery process.

With reference to FIG. 1, one embodiment of an apparatus 100 is shown that is associated with device discovery caching. The apparatus 100 includes a discovery logic 110 and a memory 115. The apparatus is installed in a mobile computing device that also includes a transmitter 120 and a receiver 130. The apparatus 100 is configured to control the transmitter 120 and the receiver 130 to send and receive packets and to store, in the memory 115, device names identified in received packets. In one embodiment, the apparatus 100 is implemented on a chip including one or more integrated circuits configured to perform one or more of the functions described herein. In one embodiment, the discovery logic 110 is implemented as a part of a print driver or print application for the mobile device.

The mobile computing device is moveable between multiple networks. A first network A is shown that includes remote devices 150, 160. A second network B is shown that includes remote devices 140, 170. When the mobile device is located within a particular network, the mobile device may seek wireless communication with one or more remote devices in the network. For example, the mobile device may seek a printer that is available in the network to print a document provided by the mobile device.

The discovery logic 110 is configured to periodically cause the transmitter 120 to transmit a discovery packet using a broadcast protocol. Because the discovery packet is broadcast, the discovery packet does not identify a recipient device, but rather is sent out to all devices in the network. Thus, if the mobile device is in network B, the discovery logic 110 broadcasts a first discovery packet to all devices in network B. The discovery logic 110 causes the receiver 130 to receive discovery response packets from remote devices in the network. Due to network traffic or physical obstacles in the network, a response may not be received from all available devices in the network. So, for example, a discovery response packet may be received from remote device 170 but not from the remote device 140. The discovery logic 110 stores the device name "170" found in the discovery response packet in the memory 115.

Later, the discovery logic 110 causes the transmitter 120 to transmit a second discovery packet using a broadcast protocol. Due one of any number of factors, such as a change in physical location of the mobile device or the remote device 170 being turned off, a discovery response packet may not be received from the remote device 170. However, a discovery response packet may be received from the remote device 140. The discovery logic 110 stores the device name "140" found in the discovery response packet in the memory 115. The memory now stores two device names: 140 and 170. Note that, in this example, at any given time a broadcast request for an available device would have returned only a single device.

The apparatus 100 is configured to receive requests from the mobile device for a list of remote devices with which the mobile device can communicate. For example, a user of the mobile computing device may use a screen interface (e.g., a "share" menu) to request a list of available printers. When the apparatus 100 receives such a request, the discovery logic 110 causes the transmitter 120 to send a confirmation packet addressed with device names stored in the memory 115.

In one embodiment, a confirmation packet is transmitted in accordance with a point-to-point communication protocol and may be addressed to each of the device names in the memory 115 or a subset of the device names. The confirmation packet is a request for the respective remote devices to respond to confirm that the respective remote devices are functioning. In the example, a confirmation packet is addressed to the remote device 140 and the remote device 170. The discovery logic 110 causes the receiver to receive confirmation response packets from responding devices. The responding devices are devices that are available to the mobile device. A list of device names corresponding to the responding devices is provided to the mobile device. So if confirmation response packets are received from both the remote device 140 and the remote device 170, the device list will include both device names 140 and 170. However, if either remote device 140 or remote device 170 does not respond to the confirmation packet, the non-responding remote device is not included in the list. In this manner, only those remote devices that are currently capable of communication with the remote device are included in the list. In one embodiment, a list of selectable device names may be displayed on a screen of the mobile device.

While the mobile device remains in network B, the discovery logic 110 causes the transmitter 120 to broadcast discovery packets periodically within network B. The device names of those devices from which discovery response packets were received are stored in the memory 115. When the mobile device moves to network A, the discovery logic causes discovery packets to be broadcast to devices in network A, and the device discovery process for devices in network A proceeds as described above for network B.

In one embodiment, a network identifier (e.g., service set identifier (SSID)) for the network is stored with, and mapped to, the device names in the memory 115. Thus, when the mobile device moves to network A, the device names for remote devices in network B are persisted in the memory 115. When the mobile device returns to network B, the devices whose names are stored in the memory can be sent confirmation packets in response to a request for device names that occurs before a discovery response packet is received from the devices.

Figure 2:
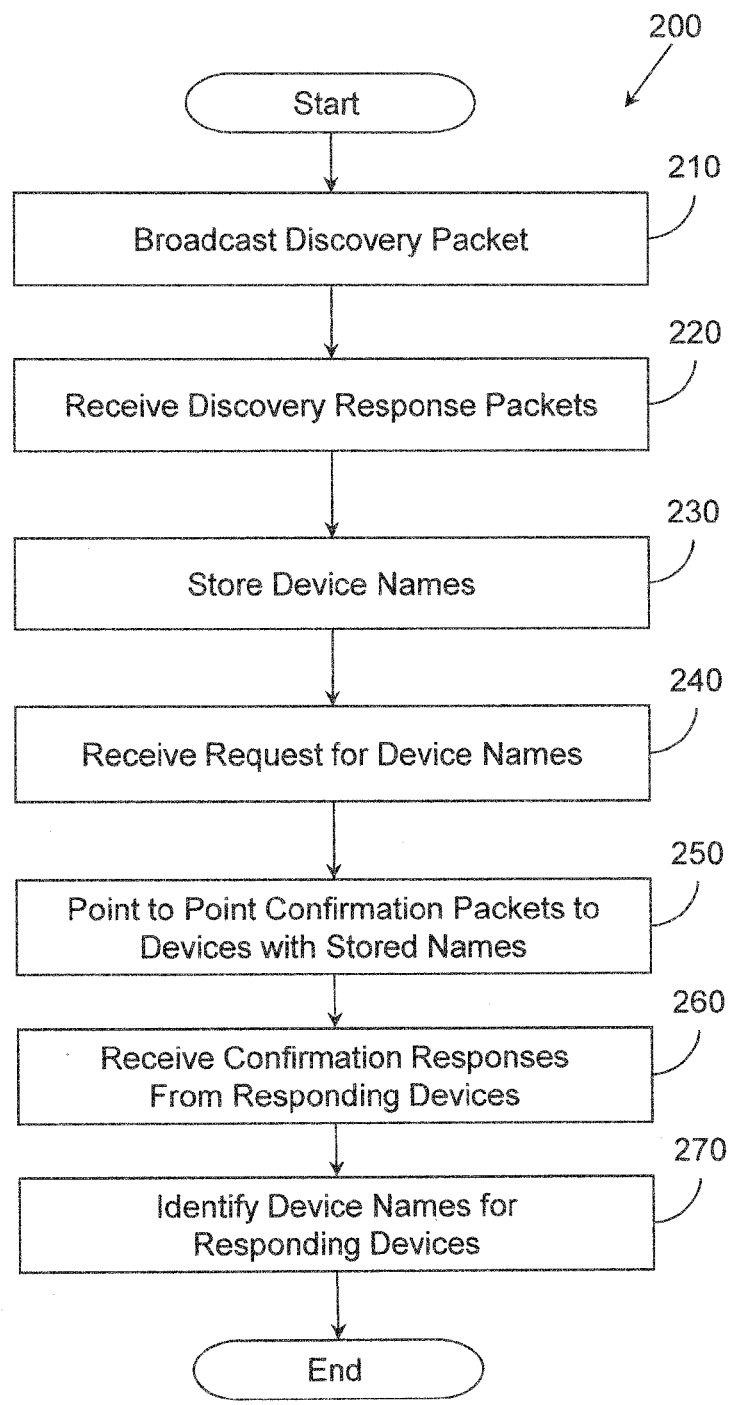
FIG. 2 illustrates one embodiment of a method associated with determining the availability of a first device in a wireless network to provide a service to a second device within the wireless network.

With reference to FIG. 2, one embodiment of a method 200 is shown that is associated with device discovery caching. The method includes, at 210 periodically transmitting a discovery packet, in accordance with a broadcast communication protocol, within a network. The discovery packet comprises a request for a responding device to reply to the request with a corresponding name of the responding device. The discovery packet may be an mDNS network query packet or any other packet that conforms to a broadcast protocol such that it is sent without being addressed to a specific device. At 220, responsive to the discovery packet periodically transmitted, the method includes receiving from each responding device that responds to the discovery packet, the corresponding name of the responding device ("discovery response packets"). The method includes, at 230, storing, in the memory, the corresponding name of each responding device from the discovery response packets. The number of responding devices having a corresponding name stored in the memory potentially increases over time as the discovery packet is periodically transmitted.

At 240 a request to identify devices in the network is received. The request may be, for example, a request to list available printers in a given network. At 250, responsive to the request to identify the devices in the network, the method includes respectively transmitting a confirmation packet, in accordance with a point-to-point protocol, to each of the number of responding devices having a corresponding name stored in the memory. The confirmation packet comprises a request for the respective responding device to confirm availability of the responding device. The point-to-point protocol utilizes a packet that is addressed to specific device names and is a network protocol with guaranteed delivery. In some embodiments, the confirmation packet is a scalable network pack (SNP) packet or an IvP packet.

At 260, the method includes, responsive to the confirmation packet respectively transmitted to each of the number of responding devices having a corresponding name stored in the memory, receiving a response confirming availability from one or more of the number of responding devices having a corresponding name stored in the memory ("confirmation response packets"). At 270, the method includes responding to the request to identify devices in the network with only the names of the one or more responding devices that confirmed availability in response to the confirmation packet respectively transmitted to the one or more responding devices.

In one embodiment, the method 200 includes associating, in the memory, a respective network identifier with respective names of responding devices, wherein the network identifier identifies a network to which the responding device is connected. In this embodiment, when the request is received a network identifier is determined for a network to which a mobile device is connected. A confirmation packet is transmitted, in accordance with a point-to-point protocol, to each of the number of responding devices having a corresponding name stored in the memory that is associated with the determined network identifier, such that the confirmation packet is not transmitted to responding devices having a corresponding name stored in the memory that is not associated with the determined network identifier.

Figure 3:
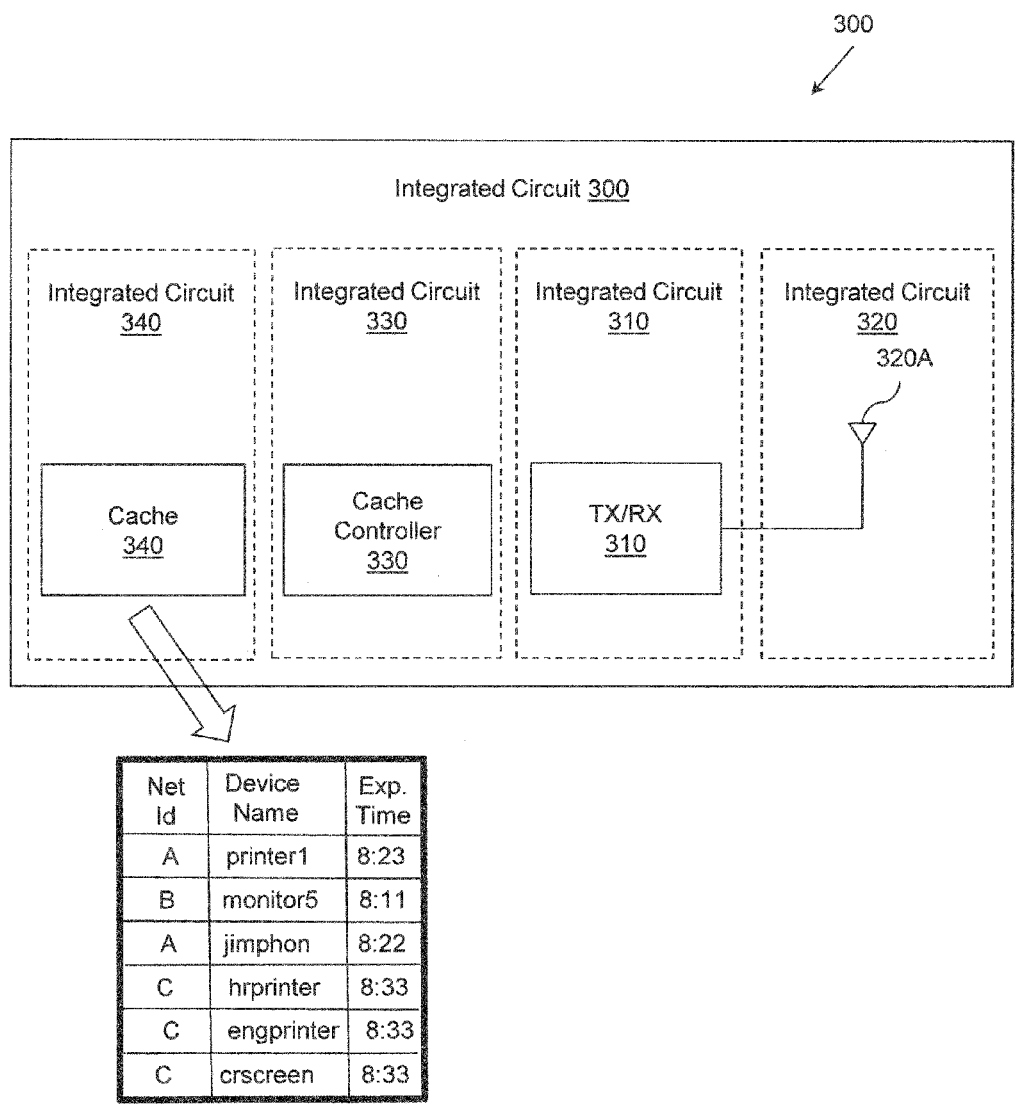
FIG. 3 illustrates one embodiment of an integrated circuit device associated with determining the availability of a first device in a wireless network to provide a service to a second device within the wireless network.

With reference to FIG. 3, one embodiment of an integrated circuit device 300 is shown that is associated with device discovery caching. The integrated circuit device 300 may be a system-on-chip that is adapted for use in a smart phone, tablet computer or other mobile computing device. The integrated circuit device 300 includes a first integrated circuit that includes a transmitter/receiver 310 and a second integrated circuit 320 that includes an antenna circuit 320 with at least one antenna 320A. The transmitter/receiver is configured to send i) discovery packets in a network using a broadcast communication protocol and ii) confirmation packets to a specific device using a point-to-point communication protocol. The discovery packets may be periodically transmitted according to a predetermined schedule or criteria as will be discussed with respect to FIG. 4. The transmitter/receiver 310 is configured to receive i) discovery response packets that include a device name for a device that sent the discovery response packet and ii) confirmation response packets from responding devices.

The integrated circuit device 300 includes a third integrated circuit 330 that provides a cache controller 330 configured to cause the transmitter/receiver 310 to broadcast the discovery packet and cause the transmitter/receiver 310 to receive the discovery response packets. The cache controller 330 is configured to store device names included in the discovery response packets in a cache 340 that is part of a fourth integrated circuit 340. In response to receiving a request to identify devices in the network, the cache controller 330 is configured to cause the transmitter/receiver 310 to transmit respective confirmation packets addressed device names in the cache 340 and to cause the transmitter/receiver 310 to receive confirmation response packets from responding devices. The cache controller 330 is configured to respond to the request with the device names of the responding devices.

In this manner, the integrated circuit device 300 caches device names of devices that have successfully responded to a broadcast discovery packet. An example portion of the cache 340 is shown in FIG. 3. The example cache portion includes entries for six different remote devices in three different networks. To avoid stale entries in the cache, the entries in the cache may be subject to deletion when some criterion is met. In one embodiment, the cache controller 330 is configured to delete a device name from the cache memory 340 upon an expiration of predetermined amount of time since a last time a discovery response packet was received from the device associated with the device name. Thus, each cache entry (e.g., device name) is assigned a "time to live" as reflected in the expiration time for each device name in the cache portion of FIG. 3. The device name "monitor5" will be deleted from the cache 340 at 8:11. If the device "monitor5" responds to a discovery packet prior to 8:11, the expiration date will be modified to reflect a new time to live period. Other cache deletion criteria could also be used. For example, if remote device sends a packet removing itself from the network, the cache entry for the device may be deleted, and so on.

Figure 4:
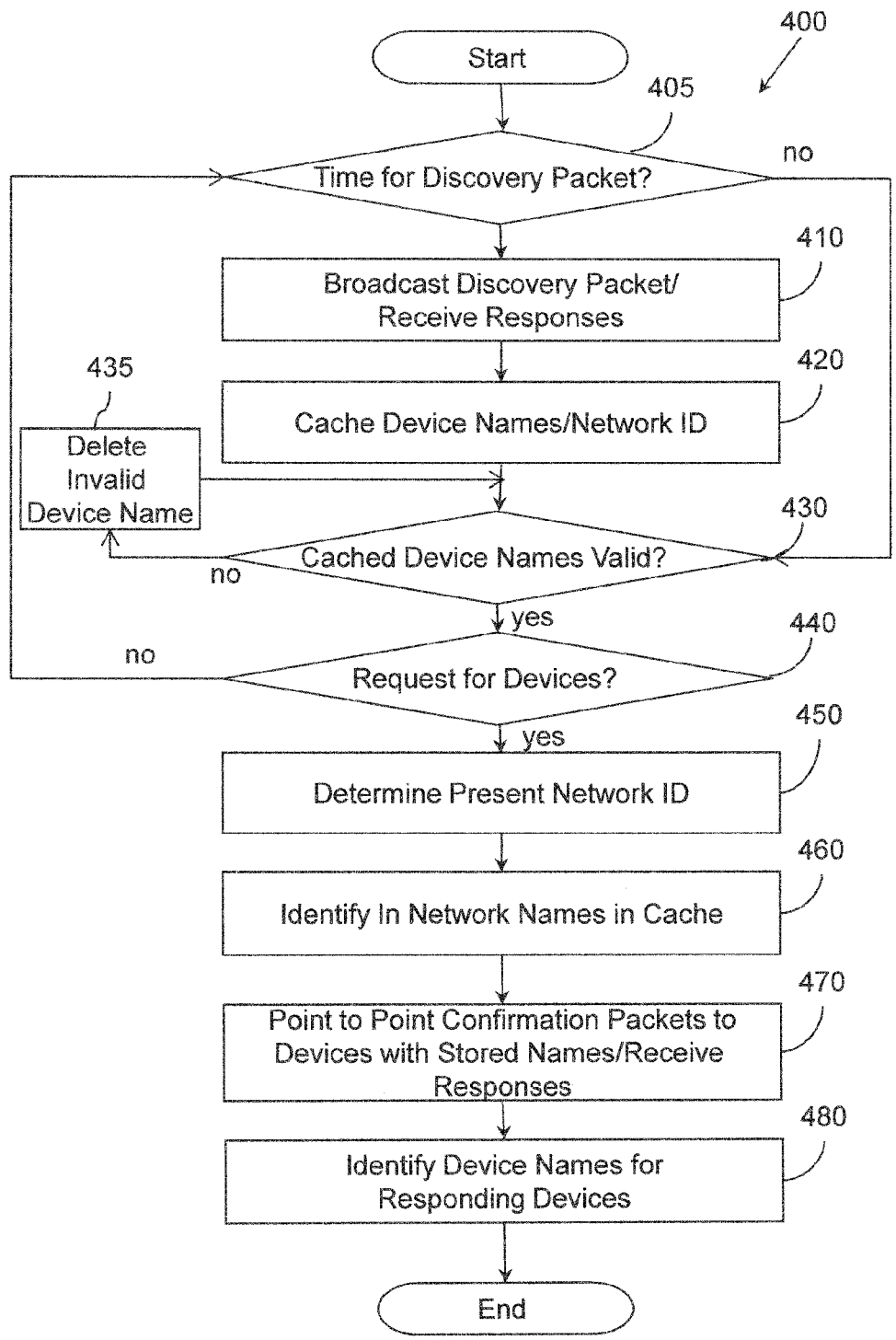
FIG. 4 illustrates one embodiment of a method associated with determining the availability of a first device in a wireless network to provide a service to a second device within the wireless network.

With reference to FIG. 4, one embodiment of a method 400 is shown that is associated with device discovery caching. The method 400 may be performed by the discovery logic 110 (FIG. 1) or the cache controller 330 (FIG. 3). At 405, the method includes determining if it is time to broadcast a discovery packet. Discovery packets may be broadcast at any appropriate time. Discovery packets may be broadcast according to a predetermined schedule at certain time intervals. In addition, discovery packets may be broadcast on demand as directed by a user employing a user interface. Discovery packets may also be broadcast automatically when a change in network topology is detected.

When it is time to broadcast a discovery packet, at 410 a discovery packet is broadcast and discovery response packets are received. At 420, device names from the discovery response packets and the network identifier are cached. At 430, a determination is made as to whether the device names in the cache are still valid (e.g., have not expired). If any device names are no longer valid, at 435 the invalid device names are deleted from the cache. When a request for device names is received at 440, the network identifier for the network in which the requesting mobile device is located is determined at 450. At 460, device names that are mapped to the network identifier in the cache are identified. At 470, confirmation packets addressed to the device names are sent using a point-to-point protocol. Confirmation response packets are received from responding devices in the network. At 480, device names for the responding devices are provided as a response to the request for device names.

In a typical environment, the cache will contain an accurate listing of available devices in the mobile device's present network. A listing of devices will be provided once a point-to-point confirmation is performed with the cached devices. This enables a mobile device to discover more available network resources without a lengthy discovery process.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus capable of movement between and connection to either a first network and a second network, the apparatus comprising:
   a memory; and
   a logic configured to, when the apparatus is connected to the first network,
      periodically cause a discovery packet to be transmitted, in accordance with a broadcast communication protocol, within the first network, wherein the discovery packet comprises a request for a responding device to reply to the request with a corresponding name of the responding device,
      responsive to transmission of each discovery packet, receive from each responding device that responds to the discovery packet, a corresponding name of the responding device,
      store, in the memory, a respective entry for each responding device, where the entry includes the corresponding name of the responding device and a network identifier for the first network,
   wherein the logic is further configured to, when the apparatus is connected to the second network,
      maintain, in memory, the entries for the responding devices in the first network,
      periodically cause a discovery packet to be transmitted, in accordance with a broadcast communication protocol, within the second network,
      responsive to transmission of each discovery packet, receive from each responding device that responds to the discovery packet, a corresponding name of the responding device,
      store, in the memory, a respective entry for each responding device, where the entry includes the corresponding name of the responding device and a network identifier for the second network, and
      receive a request to identify devices in the network,
      responsive to the request to identify the devices in the network,
         determine that the apparatus is in the first network,
         access the memory to identify entries that include the identifier for the first network,
         cause respective confirmation packets addressed to respective names in each of the respective identified entries to be transmitted, in accordance with a point-to-point protocol,
            such that a confirmation packet is not transmitted to a name in an entry that does not include the network identifier for the first network,
         wherein the confirmation packet comprises a request for a respective responding device to confirm availability of the responding device, and
         responsive to transmission of the confirmation packet, receive a response confirming availability from one or more responding devices, and
         respond to the request to identify devices in the network with the names of the responding devices that confirmed availability in response to the confirmation packet.

2. The apparatus of claim 1, wherein the logic is configured to delete entries from the memory when a deletion criteria is met.

3. The apparatus of claim 2, wherein the deletion criteria is expiration of predetermined amount of time since a last time a response confirming availability packet was received from the responding device associated with the name.

4. The apparatus of claim 1, wherein the confirmation packet conforms to a network protocol with guaranteed delivery.

5. The apparatus of claim 1, wherein the discovery packet comprises a multipoint domain name service (mDNS) packet.

6. The apparatus of claim 1, wherein the logic is configured to respond to the request by displaying the responding device names in a share menu of a mobile device.

7. A method, comprising:
   when a mobile device that is capable of movement between and connection to a first network or a second network is in the first network, with the mobile device:
      periodically transmitting a first discovery packet, in accordance with a broadcast communication protocol, within the first network, wherein the discovery packet comprises a request for a responding device to reply to the request with a corresponding name of the responding device;
      responsive to the transmission of each discovery packet, receiving from each device that responds to the discovery packet, a corresponding name of the device; and
      storing, in the memory, a respective entry for each responding device, where the entry includes the corresponding name of the responding device and a network identifier for the first network;
   when the mobile device is in the second network;
      maintaining, in memory, the entries for the responding devices in the first network;
      periodically transmitting a discovery packet, in accordance with a broadcast communication protocol, within the second network;
      responsive to the transmission of each discovery packet, receiving from each responding device that responds to the discovery packet, a corresponding name of the device; and
      storing, in the memory, a respective entry for each responding device, where the entry includes the name of the responding device and a network identifier for the second network;
   receiving a request to identify devices in the network;
   responsive to the request to identify the devices in the network,
      determining that the mobile device is in the first network;

accessing the memory and identifying entries that include the identifier for the first network;

transmitting respective confirmation packets addressed to respective names in each of the respective identified entries, in accordance with a point-to-point protocol, wherein the confirmation packet comprises a request for a respective responding device to confirm availability of the responding device;

such that a confirmation packet is not transmitted to a name in an entry that does not include the network identifier for the first network, responsive to the transmission of the confirmation packet, receiving a response confirming availability from one or more responding devices; and responding to the request to identify devices in the network with the names of the one or more responding devices that confirmed availability in response to the confirmation packet.

8. The method of claim 7, further comprising deleting a name from the memory upon an expiration of predetermined amount of time since a last time a responding device having the corresponding name stored in the memory the name confirmed availability in response to a confirmation packet.

9. The method of claim 7, comprising automatically broadcasting the discovery packet according to a predetermined schedule.

10. The method of claim 7, comprising broadcasting the discovery packet when a change in topology of the network is detected.

11. The method of claim 7, wherein the confirmation packet conforms to a network protocol with guaranteed delivery.

12. The method of claim 7, wherein the discovery packet comprises a multipoint domain name service (mDNS) packet.

13. An integrated circuit device capable of movement between and connection to either a first network or a second network, the device comprising:
 a cache memory;
 a transmitter;
 a receiver; and
 a cache controller configured to, when the integrated circuit device is in the first network,
  cause the transmitter to periodically send a discovery packet, in the first network, in accordance with broadcast communication protocol, wherein the discovery packet comprises a request for a responding device to reply to the request with a corresponding name of the responding device,
  cause the receiver to receive from each responding device that responds to the discovery packet, a corresponding name of the responding device, and
  store, in the cache, a respective entry for each responding device, where the entry includes the corresponding name of the responding device and a network identifier for the first network;
 wherein the cache controller is further configured to, when the integrated circuit device is in the second network,
  maintain, in the cache, the entries for the responding devices in the first network,
  cause the transmitter to periodically send a discovery packet, in the second network, in accordance with a broadcast communication protocol,
  cause the receiver to receive from each responding device that responds to the discover packet, a corresponding name of the responding device; and
  store, in the cache, a respective entry for each responding device, where the entry includes the corresponding name of the responding device and a network identifier for the second network; and
 wherein the cache controller is further configured to, in response to a request to identify devices in a network;
  determine that the integrated circuit device is in the first network,
  access the memory to identify entries that include the identifier for the first network,
  cause the transmitter to send respective confirmation packets to respective names in each of the respective identified entries in accordance with a point-to-point communication protocol, wherein a confirmation packet comprises a request for the respective responding devices to confirm availability of the responding devices,
  such that a confirmation packet is not transmitted to a name in an entry that does not include the network identifier for the first network,
  responsive to the transmission of the confirmation packet, cause the receiver to receive a response confirming availability from one or more responding devices, and
  respond to the request to identify devices in the network with the names of the responding devices that confirmed availability in response to the confirmation.

14. The device of claim 13, wherein the confirmation packet conforms to a network protocol with guaranteed delivery.

15. The device of claim 13, wherein the discovery packet comprises a multipoint domain name service (mDNS) packet.

16. The device of claim 13, wherein the cache controller is further configured to delete a name from the cache memory upon an expiration of predetermined amount of time since a last time a responding device having the corresponding name stored in the memory the name confirmed availability in response to a confirmation packet.

17. The device of claim 13, wherein the cache controller is further configured to cause the transmitter to broadcast the discovery packet according to a predetermined schedule.

* * * * *